United States Patent [19]

Brown et al.

[11] 4,137,199

[45] Jan. 30, 1979

[54] FIRE-RETARDANT COMPOSITION

[75] Inventors: Geoffrey T. Brown; John R. Case, both of Runcorn, England

[73] Assignee: Imperial Chemical Industries Limited, London, England

[21] Appl. No.: 593,241

[22] Filed: Jul. 7, 1975

[30] Foreign Application Priority Data

Jul. 16, 1974 [GB] United Kingdom ............... 31424/74
Jul. 16, 1974 [GB] United Kingdom ............... 31423/74

[51] Int. Cl.$^2$ .............................................. C08J 9/00
[52] U.S. Cl. .................................... 521/138; 521/103; 521/106; 521/117; 521/118

[58] Field of Search .......... 260/2.5 R, 2.5 AE, 2.5 A, 260/2.5 L, 2.5 S, 2.5 F, 2.5 EP, 2.5 FP, 2.5 H, 2.5 HA, 2.5 HB, 2.5 AJ, 2.5 AN, 2.5 AV, 2.5 AT, 2.5 N

[56] References Cited

U.S. PATENT DOCUMENTS 2,780,606  2/1957  Hoppe et al. ................... 260/2.5 AE
3,660,321  5/1972  Praetzel et al. ................. 260/2.5 FP Primary Examiner—J. Ziegler
Attorney, Agent, or Firm—Cushman, Darby & Cushman

[57] ABSTRACT

Composite materials composed of an organic polymer containing a fire-retardant together with a blowing agent and a hydroxy group-containing organic acid or a salt thereof, or a reaction product of the blowing agent and said acid or salt.

20 Claims, No Drawings

FIRE-RETARDANT COMPOSITION

This invention relates to a composite material comprising an organic polymer, in particular to a composite material having fire-retardant properties.

Composite materials comprising an organic polymer and a fire-retardant additive, that is, an additive which decreases the tendency of the organic polymer to burn, are well-known in the art. Fire-retardant additives known in the art include phosphates, e.g. ammonium polyphosphate, halogenated polyolefins, halogenated phosphate esters, and antimony compounds.

It is also known in the art to further improve the fire-retardant properties of such composite materials by including in the composite material a blowing agent which at elevated temperature is capable of decomposing with evolution of a non-flammable gas. A blowing agent commonly proposed for use in such compositions is melamine.

We have now found that the fire-retardant properties of such composite materials may be further improved, that is, the materials may be made to have an even more reduced tendency to burn, by including an additional component in the composite material.

According to the present invention there is provided a composite material comprising a mixture of
(a) an organic polymer,
(b) a fire-retardant additive, and
(c)
   (i) a blowing agent (as hereinafter defined) and a hydroxy group-containing organic acid, or an amino group-containing organic acid, or a salt of said acid, or
   (ii) a reaction product of said blowing agent with said hydroxy group-containing organic acid, or with said amino group-containing organic acid, or with said salt.

The fire-retardant additive is suitably an acid or a source of acid, that is, a material which is capable of generating an acid at elevated temperature and especially in a fire situation. Other fire-retardant additives, e.g. halogenated polyolefins and anitimony compounds may be used, although it is to be understood that not all additives will produce a fire-retardance effect with all organic polymers. Alternatively, or in addition, the organic polymer may itself contain a fire-retardant component incorporated into the macromolecular chain of the polymer. For example, where the organic polymer is a polyester resin the macromolecular chain of the polyester may include a halogenated component, for example a chlorendic acid residue:

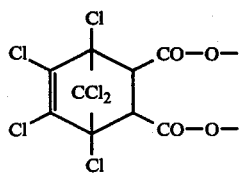

The composite material may contain two or more different fire-retardant additives.

The fire-retardant additive is preferably a phosphate, i.e. it may be a source of phosphoric acid. For example, the phosphate may be ammonium phosphate; a polyphosphate, e.g. ammonium polyphosphate; an amino group-containing phosphate, e.g. urea phosphate or melamine phosphate; or a halogenated phosphate ester.

A preferred fire-retardant additive is an inorganic oxide phosphate glass having a transformation temperature (as hereinafter defined) of not greater than 300° C. and containing at least 25 mole % of $P_2O_5$.

The transformation temperature of the glass is defined herein as the value determined by differential calorimetry using the du Pont Differential Thermal Analyser according to the following procedure. A sample of the powdered glass and a reference sample of pure powdered silica are heated at a programmed rate of temperature increase of 20° C./min, and a graph is obtained of the temperature difference between the samples plotted against the temperature of the reference sample. This curve typically has a linear portion of small slope and a second linear portion of larger negative slope at higher temperatures. The two linear portions are produced so that they intersect, and the transformation temperature is taken as the temperature corresponding to the point of intersection.

Suitable phosphate glasses include any of the glasses having appropriate transformation temperatures as described in our British Patent Specifications Nos. 1356919, 1369240, 1371377 and 1395942 the disclosures of which are incorporated herein. The fire-retardant effect is greater the lower is the transformation temperature of the phosphate glass and a transformation temperature of not greater than 250° C. is preferred. Most preferably the transformation temperature is not greater than 175° C. The transformation is suitably at least 100° C. otherwise the glass may have an undesirable sensitivity to water.

The fire-retardant effect is improved with increase in the amount of $P_2O_5$ in the phosphate glass and the phosphate glass preferably comprises at least 50 mole % $P_2O_5$ and more preferably at least 60 mole % $P_2O_5$. The sensitivity of the glass to water increases with increase in the $P_2O_5$ content and a $P_2O_5$ content of not greater than 75 mole % is preferred as above this value the phosphate glass may be unduly water-sensitive.

The phosphate glass may in addition contain one or more alkali metal oxides, e.g. $Li_2O$, $K_2O$ or $Na_2O$; one or more alkaline earth metal oxides for improved durability to water, e.g. BaO, CaO, MgO or SrO; $B_2O_3$ which improves the durability of the glasses to water and which, especially at low levels of $B_2O_3$, reduces the tendency of crystallites to form in the glass; PbO or $Sb_2O_3$ or a mixture thereof in order to control the refractive index of the glass and more nearly match it to that of the polymer in the composite material; or oxides of one or more of Cd, Zn, V, Cr, W, Bi or hydrogen in the form of combined water.

A preferred glass comprises, in mole %, $P_2O_5$ 50 to 72, $B_2O_3$ 1.2 to 3.5, PbO 0 to 30, one or more transition metal oxides 0 to 5, and 0 to 30 of one or more oxides selected from alkali metal oxides, alkaline earth metal oxides and zinc oxide and preferably at least 2 mole %, more preferably at least 5 mole %, and most preferably at least 10 mole % of one or more of these latter oxides. This latter glass preferably includes at least one alkali metal oxide and at least one oxide selected from alkaline earth metal oxides and zinc oxide. For the purposes of definition of the mole % composition water is excluded from the composition quoted above. However, water may be present in the glass composition in a proportion of up to 5 weight % of the glass composition.

By transition metal oxide we mean an oxide of a metal in Groups IIIA, IVA, VA, VIA, VIIA, VIII and IB of the Periodic Table of the Elements as given on the inside back cover of "Advanced Inorganic Chemistry" by F. A. Cotton and G. Wilkinson, 2nd Edition 1966, Interscience Publishers, and including an oxide of the lanthanide and actinide series.

A preferred phosphate glass has the following mole % composition, $P_2O_5$ 66.1, $B_2O_3$ 2.3, $Na_2O$ 7.1, $Li_2O$ 7.1, MgO 2.4, CaO 2.4 and PbO 12.6.

The phosphate glass may be prepared by heating together the appropriate oxides, or their precursors. By 'precursor' is means a compound which on heating will react to give the same chemical composition in the product glass as if the oxide has been used. Usually this reaction will occur with evolution of one or more volatile compounds, for example water, carbon dioxide and/or ammonia. Thus, suitable precursors of phosphoric oxide include phosphoric acid and ammonium phosphates, while carbonates may be used as precursors of metal oxides. Mixtures of an oxide and a precursor of that oxide, or of two or more precursors of the same oxide may be used, and the same compound may be used as a precursor of more than one oxide, thus for example, potassium phosphate is a precursor of $K_2O$ and of $P_2O_5$.

The heating may be carried out in a two-stage process in which some or all of the components are first heated together at a relatively low temperature, for example 300°–500° C., to give a glassy mixture (conveniently referred to as the premelt), which is then refined at a higher temperature, for example 500°–800° C. During the refining step water is lost and as evolution of water proceeds the transformation temperature of the resultant glass increases. Thus, control of the refining step may be used to control the transformation temperature of the resultant glass.

By blowing agent we mean a compound which decomposes when heated to a temperature in the range 150° C. to 400° C. with evolution of a non-flammable gas, for example, ammonia, nitrogen, water or carbon dioxide.

The blowing agent may suitably be a base, for example, a base containing an amine group or a plurality of such groups. Suitable amino group-containing bases include urea, guanidine, dicyandiamide and especially melamine. Other suitable amino group-containing blowing agents include purine and substituted derivatives of purine, e.g. adenine, guanine, guanosine, and adenosine.

The composite material may contain two or more different blowing agents.

The hydroxy group-containing or amino group-containing orgaic acid, or salt thereof, is generally a compound which is capable of intumescing under suitable conditions, e.g. at elevated temperature, and is preferably capable of intumescing under conditions substantially similar to those which cause the blowing agent to decompose. The organic acid or salt thereof is preferably capable of forming a carbonaceous char at elevated temperature. The carbonaceous char is believed to be formed, at least in part, by dehydration of the organic acid at elevated temperature, or by loss of ammonia from the organic acid.

Where the organic acid is present in the form of a salt alkali metal salts are preferred, especially alkali metal acid salts in the case where the organic acid contains a plurality of acid groups. The invention will be described hereafter with reference to the organic acid rather than the salt unless reference to the salt is required.

Hydroxy group-containing organic acids are preferred, especially those containing a plurality of hydroxy groups, and in a further preferred form of the invention the composite material contains a reaction product of the blowing agent and the organic acid rather than a mixture thereof as we find that the reaction product may be less sensitive to water than the mixture and thus may be less readily removed from the composite material by the action of water on the composite material.

The organic acid may be a carboxylic acid and it may be a monocarboxylic acid or a polycarboxylic acid. Suitable hydroxy group-containing or amino group-containing organic acids having the structure

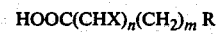

$$HOOC(CHX)_n(CH_2)_m R$$

where m is zero or an integer, n is an integer, R is an organic group, and X is —OH or —NH$_2$ or substituted amino, or a structure in which some at least of the carbon atoms carry substituent groups in place of hydrogen atoms. R may be, for example, a hydrocarbyl group, a substituted hydrocarbyl group, e.g. a hydroxy alkyl group or a carboxyl group. The integer n is preferably 2 or greater, e.g. 2 to 10. m is preferably zero. Suitable hydroxy group-containing organic acids include tartaric acid in which m is zero, n is 2, X is —OH and R is —COOH, malic acid in which m is 1, n is 1, X is —OH and R is —COOH, and gluconic acid in which n is 4, m is zero, X is —OH and R is —CH$_2$OH. A suitable amino group-containing organic acid is glutamic acid in which m is 2, n is 1, X is —NH$_2$ and R is —COOH.

A preferred combination of blowing agent and organic acid, on account of the fire-retardant properties conferred on the composite material, is melamine and tartaric acid or a reaction product thereof.

Mixtures of two or more difficult organic acids may be used.

Where the blowing agent and the organic acid contain suitably reactive groups, for example, where the blowing agent is a base, then the blowing agent and organic acid or salt thereof may simply be reacted together. For example, where the blowing agent is melamine or other suitable amino group-containing compound the organic acid or salt thereof and the blowing agent may be reacted together in solution, e.g. in aqueous solution, by mixing solutions of the respective components and separating the resultant salt from the solution. Alternatively, the components may be formed by reaction of the components in liquid form, e.g. by fusing the components together at elevated temperature.

Although the composite material may contain a reaction product of the blowing agent and the organic acid or salt thereof, e.g. a reaction product of an amino group-containing compound and an organic acid or salt thereof, it is to be understood that the reaction product may be formed from a derivative of the blowing agent, for example, where the blowing agent is melamine, melamine hydrochloride may be used.

The blowing agent and organic acid, or reaction product thereof, are suitably incorporated into the composite material in a powder form.

The organic polymer may be a thermosetting resin or a thermoplastic material. Suitable thermosetting resins include, for example, polyester resins produced by curing of a mixture of an unsaturated polyester and an ethylenically unsaturated monomer copolymerisable therewith, an epoxy resin, a polyurethane resin, and a melamine-formaldehyde resin. Mixtures of thermosetting resins may be used. Where we refer to a thermosetting resin we mean a resin in its cured form.

Suitable thermoplastic materials include polyolefins, for example, polyethylene, polypropylene, poly-(4-methyl pentene-1) and copolymers of olefins; acrylic polymers, for example, poly(acrylic acid), poly(methacrylic acid), poly(methyl acrylate), poly(ethyl acrylate), poly(ethyl mechacrylate) and poly(acrylonitrile); polystyrene; acrylonitrile-butadiene-styrene copolymers; poly(vinyl halides) and poly(vinylidene halides), for example poly(vinyl chloride) and poly(vinylidene chloride) and copolymers of vinyl chloride and/or vinylidene chloride with other copolymerisable monomers; polysulphones; polycarbonates; polyesters, for example poly(ethylene terephthalate); and polyamides.

In the composite material the blowing agent and organic acid may be present in various proportions, or the reaction product thereof may be formed by reaction of various proportions of the blowing agent and organic acid. As in general the functionality in respect of the reactive groups in the blowing agent and organic acid will vary between 1 and 3 the blowing agent and the organic acid will generally be present in the composite material in a proportion in the range, or when present as a reaction product will be formed by reaction of proportions in the range, 3:1 to 1:3 parts by mole.

The fire-retardant, especially when it is in the form of a phosphate glass, may be present in the composite material in the form of fibres, flakes, particles or as fine powder. Preferably, where the fire-retardant is an inorganic oxide phosphate glass it is present in the form of particles having dimensions in the range 5 to 500 microns, more preferably 150 to 300 microns, as it is found that a greater fire-retardant effect is produced by glass in a particulate form having these dimensions than is produced, for example, by glass in the form of a fine powder or larger size particles.

The proportion of fire-retardant additive present in the composite material may suitably be in a range of 2% to 60% by weight of the organic polymer, and is preferably in the range 5% to 30% by weight of the organic polymer.

In the composite material the blowing agent and organic acid in total, or the reaction product thereof, may suitably be present in a proportion of 2% to 20% by weight of the organic polymer, and preferably in a range of 3% to 10% by weight of the organic polymer.

The fire-retardant additive and the blowing agent and organic acid or reaction product thereof may be incorporated into the organic polymer by conventional methods for incorporating particulate materials into organic polymers. For example, where the organic polymer is a thermosetting resin the fire-retardant additive and the blowing agent and organic acid or reaction product thereof may be mixed with the liquid precursors of the resin and the resin may subsequently be cured by means well known in the art, for example, by heating in the presence of a peroxide catalyst in the case where the thermosetting resin is a polyester resin. Where the organic polymer is a thermoplastic material the fire-retardant additive and the blowing agent and organic acid or reaction product thereof may be blended with the organic polymer, for example, or a 2- or 3-roll mill. The composite material may have any desired shape but it is conveniently in the form of a sheet, although it may be in the form of a film, for example, a gel coat.

The composite material of the present invention may contain conventional fillers. For example, the material may contain a fibrous filler, for example, glass fibre, e.g. E-glass fibre, or carbon fibre. The fibrous filler may be in the form of continuous fibre or short fibres or a mixture of such fibres. Where the composite material contains fibrous filler the fibre preferably has a combination of fibre content and fibre length such that when a sample of the fibre-filled organic polymer which does not contain fire-retardant additive and blowing agent and organic acid or reaction product thereof is burned the sample does not disintegrate but leaves a residue of fibrous filler of approximately the same dimension as the original sample. Preferably, the composite material contains at least 5%, and more preferably at least 10% of fibrous filler by volume of the fibre-containing composite material, and suitably up to 30% by volume.

The composite material may contain other filler materials, for example, particulate talc and calcium carbonate.

The composite material may be in the form of a foam.

Both the organic polymer and the fire-retardant additive may be transparent and the refractive index of the fire-retardant additive may be selected to match that of the organic polymer so as to produce a translucent composite material. For this purpose it is especially convenient to use an inorganic oxide phosphate glass as the fire-retardant additive.

Composite materials according to the present invention may be adversely affected by weathering, for example, where the fire-retardant additive is an inorganic oxide phosphate glass. In translucent sheet composite material the light transmission may decrease and the degree of diffusion may increase on exposure to water. These adverse effects may be due at least in part to hydrolysis of the glass and may be reduced by coating the glass with a hydrophobic material, or with a coupling agent which increases the bonding of the glass to the organic polymeric material.

In the composite material of the invention the hydroxy group-containing or amino group-containing organic acid may function as a blowing agent, that is, it may be capable of decomposing when heated to a temperature in the range 150° C. to 400° C. with evolution of a non-flammable gas. It is to be understood that although the organic acid may function as a blowing agent the composite material of the invention must contain at least one blowing agent in addition to the organic acid and which is not a hydroxy group-containing or amino group-containing organic acid.

The invention is now illustrated by the following Examples in which all parts are expressed as parts by weight.

Fire-retardancy was measured using the oxygen index test ASTM D2863-70 in which a sample is burned in an oxygen/nitrogen atmosphere of controlled oxygen content, the limiting oxygen index being the percentage by volume of oxygen in the atmosphere which is necessary to just support combustion of the sample.

EXAMPLE 1

A salt of melamine and tartaric acid was prepared by mixing an aqueous solution containing two molecular parts of melamine hydrochloride with an aqueous solution containing one molecular part of disodium tartrate.

The precipitate which was formed was washed with water and dried to constant weight in a vacuum oven at 80° C. The dried precipitate was found by analysis to comprise melamine tartrate.

An inorganic oxide glass having a mole % composition of $P_2O_5$ 65.7, $Li_2O$ 9.4, $Na_2O$ 9.4, $B_2O_3$ 2.4 and PbO 13.1 and containing a small weight percentage of water such as to have a transformation temperature (measured as herein described) of 132° C. was made by heating appropriate amounts of ammonium dihydrogen phosphate, boric acid, lead oxide, lithium carbonate and sodium carbonate at 300° C. until a clean viscous melt was formed. The melt was allowed to cool to a solid, the solid was broken into pieces, and the solid was heated at 700° C. in an alumina crucible until sampling of the glass showed that a glass having a transformation temperature of 132° C. had been produced. The glass was poured onto a metal slab and it was then ground to a particle size in the range 150μm to 250μm.

A composition was made by mixing 40 parts of a polyester resin having an acid value of 31 mg KOH $g^{-1}$ and comprising 62% by weight of an ethylenically-unsaturated polyester formed from maleic anhydride, phthalic anhydride (maleic anhydride:phthalic anhydride molar proportion 2:1) and ethylene glycol and 38% by weight of a mixture of styrene and methyl methacrylate, 0.3 part of a 1% solution of cobalt naphthenate and 0.6 part of cyclohexanone peroxide catalyst, 6 parts of melamine tartrate having a particle size less than 250μm, and 10 parts of the powdered inorganic oxide glass.

3 pieces of powder-bonded E-glass fibre mat each measuring 6 inch × 3 inch were impregnated with the composition, the impregnated mats were formed into a laminate, and the laminate was heated at 35° C. for 3 hours and for 3 hours at 85° C.

The limiting oxygen index of the resultant laminate measured according to the procedure of ASTM D2863-70 was 43%.

By way of comparison the above procedure was repeated except that the melamine tartrate was replaced by a stoichiometrically equivalent amount of melamine. The limiting oxygen index of the resultant laminate was 36%.

EXAMPLE 2

A laminate was produced following the procedure described in Example 1 except that the polyester resin which was used had an acid value of 24 mg KOH $g^{-1}$ and comprised 73% by weight of an ethylenically-unsaturated polyester formed from hexachloroendomethylene tetrahydrophthalic acid (HET acid), maleic anhydride (HET acid: maleic anhydride molar proportion 1.5:1) and propylene glycol and 27% by weight of styrene.

The limiting oxygen index of the resultant laminate was 59%.

EXAMPLE 3

A solution of melamine in water was mixed with a solution of gluconic acid in water, the molar ratio of melamine to gluconic acid being 1:1. The resultant clear solution was evaporated to small bulk, solid melamine gluconate was allowed to separate, and the melamine gluconate was dried.

The procedure of Example 1 was followed except that the polyester resin used in Example 1 was replaced by the polyester resin used in Example 2 and the melamine tartrate used in Example 1 was replaced by a stoichiometrically equivalent amount of melamine gluconate.

The limiting oxygen index of the resultant laminate was 58%.

EXAMPLE 4

The procedure of Example 1 was followed except that only one piece of powder-bonded E-glass fibre mat was used and the composition which was used comprised 27 parts of a polyester resin having an acid value of 23 mg KOH $g^{-1}$, the resin comprising 65% by weight of an ethylenically-unsaturated polyester formed from maleic anhydride, phthalic anhydride (maleic anhydride:phthalic anhydride molar proportion 2:1) and propylene glycol and 35% weight of styrene, 0.2 part of a 1% solution of cobalt naphthenate, 0.4 part of cyclohexanone peroxide catalyst, 4 parts of melamine malate having a particle size of less than 250μm, and 6.7 parts of inorganic oxide glass having a particle size in the range 150μm to 250μm, a transformation temperature of 160° C., and a mole % composition of $P_2O_5$ 66.2, $B_2O_3$ 2.2, $Li_2O$ 7.1, $Na_2O$ 7.1, PbO 12.6, MgO 2.4 and CaO 2.4.

The glass was formed by the procedure described in Example 1 except that the glass-forming mixture contained additionally magnesium oxide and calcium carbonate, and the melamine malate was formed by the procedure described in Example 1 for the preparation of melamine tartrate except that the disodium tartrate was replaced by disodium malate.

The limiting oxygen index of the resultant material was 27.6%.

By way of comparison the above procedure was repeated except that the melamine malate was omitted. The resultant material had a limiting oxygen index of 20%.

EXAMPLE 5

The procedure of Example 4 was followed except that the melamine malate used in Example 4 was replaced by 4 parts of melamine glutamate. The melamine glutamate was prepared by the procedure described in Example 1 for the preparation of melamine tartrate except that the disodium tartrate was replaced by sodium glutamate.

The limiting oxygen index of the resultant material was 27.3%.

EXAMPLE 6

The procedure of Example 1 was followed except that an inorganic oxide glass as used in Example 4 was used.

The limiting oxygen index of the resultant laminate was 35%.

EXAMPLE 7

The procedure of Example 2 was followed except that an inorganic oxide glass as used in Example 4 was used. The limiting oxygen index of the resultant laminate was 49%.

EXAMPLE 8

The procedure of Example 1 was followed except that the inorganic oxide glass which was used had a transformation temperature of 160° C., a particle size in the range 150μm to 250μm, and a mole % composition of $P_2O_5$ 66.2, $Li_2O$ 7.1, $Na_2O$ 3.1, $B_2O_3$ 6.2, PbO 12.6 and MgO 4.8, the glass being made by the procedure described in Example 1 except that the glass-forming mixture contained additionally magnesium oxide. The limiting oxygen index of the resultant laminate was 31.5%.

EXAMPLE 9

The procedure of Example 1 was followed except that the composition which was used comprised 40 parts of polyester resin as used in Example 2, 0.8 part of a 0.4% solution of cobalt naphthenate accelerator, 0.5 part of cyclohexanone peroxide catalyst, 4 parts of melamine tartrate, and 10 parts of ammonium polyphosphate (Phoschek P/60, Monsanto Chemical Co) in place of the inorganic oxide glass used in Example 1.

The limiting oxygen index of the resultant laminate was 48%.

EXAMPLE 10

A rigid polyurethane foam was prepared by mixing 100 parts of a glycerol-propylene oxide polyether (Daltolac 60 LV, Imperial Chemical Industries Limited), 2 parts of N,N-dimethyl-cyclohexylamine catalyst, 4 parts of a propylene oxide-ethylene oxide block copolymer (Lubrol FSA), 2 parts of water and 0.8 part of a silicone surfactant. To the mixture there was added with rapid stirring 13.5 parts of a halogenated blowing agent ('Arcton' 11, Imperial Chemical Industries Limited), 21 parts of an inorganic oxide glass as used in Example 1, 7 parts of melamine tartrate, and 80.7 parts of diisocyanato diphenyl methane. The resultant mixture was poured into a rectangular mould and was allowed to rise and solidify.

Slabs of foam having dimensions 150 mm × 50 mm × 12 mm were cut from the solid foam and tested according to the procedure of ASTM 1692. The slabs were found to be self-extinguishing with a median burning rate of 78 mm per minute.

By way of comparison the above procedure was repeated except that inorganic oxide glass and melamine tartrate were omitted. The slabs of foam were not self-extinguishing and had a median burning rate of 260 mm per minute.

By way of further comparison the above procedure was repeated except that the melamine tartrate was omitted. The slabs of foam were not self-extinguishing and had a median burning rate of 105 mm per minute.

EXAMPLE 11

The procedure of Example 1 was followed except that 0.8 part of cyclohexanone peroxide catalyst was used, and in place of the melamine tartrate there was used 3.5 parts of a mixture formed by grinding 10 parts of melamine and 5.9 parts of tartaric acid in a rod-mill for 1 hour.

The resultant laminate had a limiting oxygen index of 38%.

EXAMPLE 12

The procedure of Example 11 was followed except that a polyester resin as used in Example 2 was used and an inorganic oxide glass as used in Example 4 was used.

The limiting oxygen index of the resultant laminate was 48%.

EXAMPLE 13

The procedure of Example 1 was followed except that there was used 40 parts of a polyester resin as used in Example 2, 0.8 part of a 0.4% solution of cobalt actoate, 0.5 part of cyclohexanone peroxide catalyst, 10 parts of an inorganic oxide glass having a transformation temperature of 130° C., a particle size in the range 150$\mu$m to 250$\mu$m and a mole % composition the same as the glass used in Example 4, and 4 parts of a mixture having a particle size of less than 250$\mu$m and formed by ball-milling for 2 hours a mixture of 16.8 parts of dicyandiamide and 15 parts of tartaric acid.

The limiting oxygen index of the resultant laminate was 57%.

EXAMPLE 14

The procedure of Example 13 was followed except that in place of the mixture of dicyandiamide and tartaric acid there was used 4 parts of a mixture having a particle size of less than 250$\mu$m and formed by ball-milling 25.2 parts of melamine and 13.4 parts of malic acid.

The limiting oxygen index of the resultant laminate was 57%.

We claim:

1. A composite material comprising a mixture of an organic polymer, a phosphate fire retardant, and
   (i) a blowing agent and a hydroxy group-containing organic acid or salt thereof, said blowing agent being characterised as a compound which decomposes with evolution of a non-flammable gas when heated to a temperature in the range 150° C. to 400° C., or
   (ii) a reaction product of a blowing agent and said acid or salt thereof.

2. A composite material as claimed in claim 1 in which the fire-retardant additive is an acid or is a source of acid.

3. A composite material as claimed in claim 1 characterised in that the phosphate is an inorganic oxide phosphate glass having a transformation temperature of not greater than 300° C. and containing at least 50 mole % of $P_2O_5$.

4. A composite material as claimed in claim 3 characterised in that the transformation temperature of the phosphate glass is not greater than 175° C.

5. A composite material as claimed in claim 3 characterised in that the phosphate glass has a mole % composition in the range $P_2O_5$ 50 to 72, $B_2O_3$ 1.2 to 3.5, PbO 0 to 30, one or more transition metal oxides 0 to 5 and one or more oxides selected from alkali metal oxides, alkaline earth metal oxides and zinc oxide 0 to 30.

6. A composite material as claimed in claim 5 characterised in that the phosphate glass has a mole % composition of $P_2O_5$ 66.1, $B_2O_3$ 2.3, $Na_2O$ 7.1, $Li_2O$ 7.1, MgO 2.4, CaO 2.4 and PbO 12.6.

7. A composite material as claimed in claim 1 characterised in that the blowing agent is a base containing at least one amino group.

8. A composite material as claimed in claim 7 characterised in that the blowing agent is melamine.

9. A composite material as claimed in claim 1 characterised in that there is present a hydroxy group-containing organic acid or a reaction product of said acid with a blowing agent.

10. A composite material as claimed in claim 8 characterised in that the hydroxy group-containing organic acid is tartaric acid or gluconic acid.

11. A composite material as claimed in claim 8 characterised in that the hydroxy group-containing organic acid is malic acid.

12. A composite material as claimed in claim 1 characterised in that the organic polymer is a thermosetting resin.

13. A composite material as claimed in claim 12 characterised in that the thermosetting resin is a polyurethane resin.

14. A composite material as claimed in claim 12 characterised in that the thermosetting resin is a polyester resin.

15. A cmposite material as claimed in claim 1 characterised in that the fireretardant additive is present in a proportion of from 20% to 60% by weight of the organic polymer.

16. A composite material as claimed in claim 1 characterised in that in total the blowing agent and the hydroxy group-containing acid, or salt thereof, or reaction product of said blowing agent with said acid or salt thereof, are present in a proportion of from 2% to 20% by weight of the organic polymer.

17. A composite material as claimed in claim 1 characterised in that the material contains fibrous reinforcement.

18. A composite material as claimed in claim 17 wherein said blowing agent is melamine and said acid is tartaric acid.

19. A composite material as claimed in claim 1 characterised in that the hydroxy group-containing organic acid has the structure $HOOC(CHOH)_n(CH_2)_mR$, where m is zero or an integer, n is an integer, and R is a hydroxy alkyl group or a carboxyl group.

20. A composite material as claimed in claim 1 characterized in that the mole proportion of blowing agent: hydroxy group-containing organic acid or salt thereof present in the composite material is in the range 3:1 to 1:3, or in that the blowing agent and hydroxy group-containing organic acid or salt thereof are present in the composite material as a reaction product of a mole proportion of blowing agent:hydroxy group-containing organic acid or salt thereof in the range 3:1 to 1:3.

* * * * *